Feb. 18, 1936. J. R. FEHR Re. 19,858
REFRIGERATING APPARATUS
Original Filed March 31, 1928
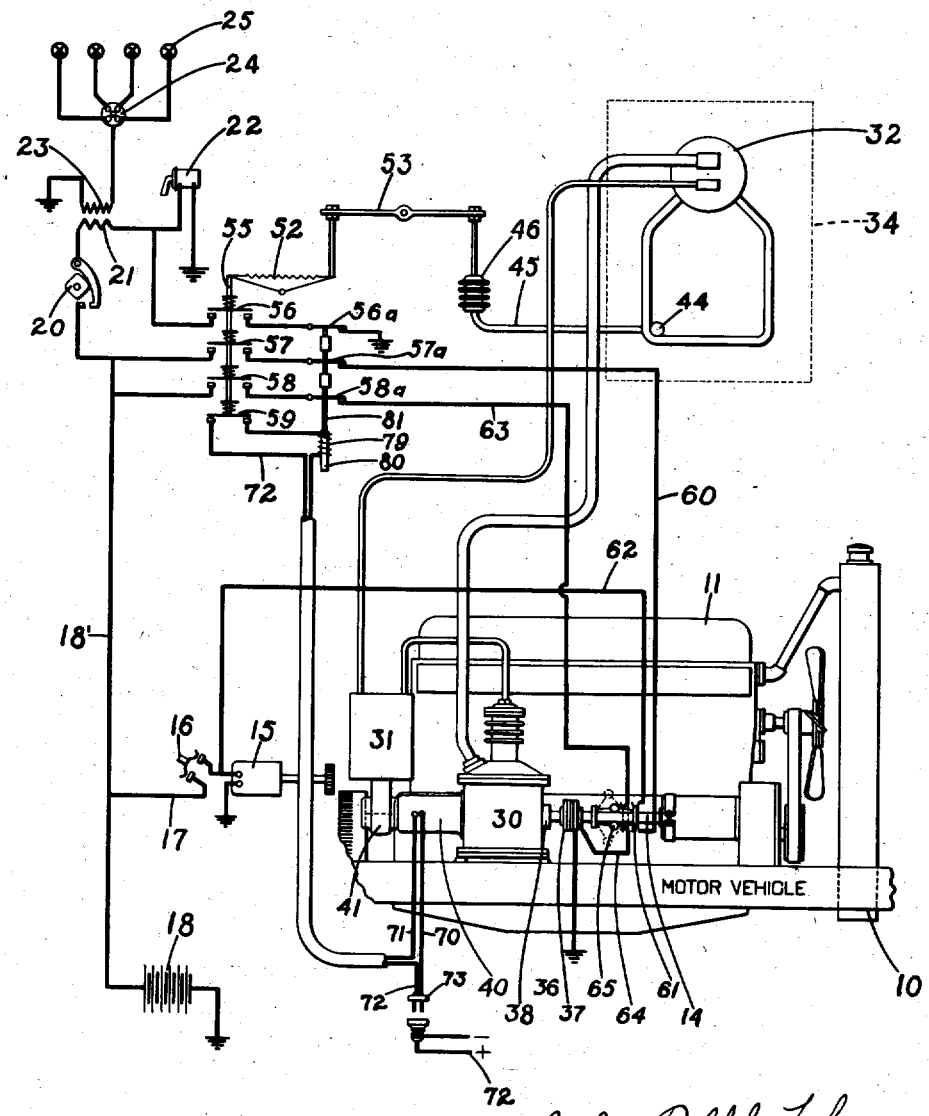
John Ralph Fehr Inventor
By Spencer, Hardman & Fehr
Attorneys Reissued Feb. 18, 1936

Re. 19,858

UNITED STATES PATENT OFFICE 19,858

REFRIGERATING APPARATUS

John Ralph Fehr, Dayton, Ohio, assignor, by mesne assignments, to General Motors Corporation, a corporation of Delaware Original No. 1,785,860, dated December 23, 1930, Serial No. 266,288, March 31, 1928. Application for reissue June 28, 1935, Serial No. 28,982

16 Claims. (Cl. 62—117)

This invention relates to refrigerating apparatus and particularly to refrigerating apparatus operated by motor vehicles.

One of the objects of the invention is to provide a refrigerated motor vehicle with convenient and economical means for supplying refrigeration at all times.

More specifically it is an object of the invention to provide a refrigerating apparatus for refrigerating a motor vehicle which may be driven either from power available on the motor vehicle or from an independent source of power.

Another object of the invention is to provide means for controlling refrigerating apparatus of the above described character whereby the operation of the apparatus from one source of power prevents it from being connected to another source of power.

Further objects and advantages of the present invention will be apparent from the following description, reference being had to the accompanying drawing, wherein a preferred form of the present invention is clearly shown.

The single figure of the drawing indicates diagrammatically a refrigerating system in connection with a motor vehicle constructed in accordance with my invention.

Referring to the drawing 10 designates any suitable motor vehicle which may be operated by a motor 11 which includes the usual accessory shaft 14, and is provided with the usual cranking motor 15. The cranking motor is provided with the usual manually operated switch 16 which closes a circuit 17 from a battery 18 through the starting motor to ground. The motor is also provided with the usual ignition circuit diagrammatically represented as including a circuit-breaker 20, low tension coil 21, and ignition switch 22, all connected in series between the battery main 18′ and ground, together with a high tension coil 23, distributor 24 and spark plugs 25. Thus the motor on the vehicle may be started by an operator whenever desired.

The vehicle carries a refrigerating system diagrammatically represented as including a compressor 30 mounted on the motor frame, a condenser 31 and an evaporator 32 disposed within an insulated compartment on the vehicle diagrammatically represented by 34. The particular construction of the apparatus so far described is immaterial to the present invention and may be of any desired form.

The compressor 30 is mounted so that its driving shaft 36 is in alignment with the accessory shaft 14 and may be coupled to the latter by means of a clutch 37 herein represented as of the magnetic type. The compressor crankcase may contain any desired gearing (not shown) for effecting the desired speed ratio between the vehicle motor and compressor. Preferably an overrunning or slipping clutch 38 is provided for insuring a substantially constant compressor speed in spite of variation in the speed of the vehicle motor. An electric motor 40 is attached to the compressor crankcase on the side opposite the clutch 38. Disposed in alignment with the motor 40 and driven by the motor is a blower 41, herein represented as of the centrifugal type for supplying air to the condenser 31 to cool the latter. Preferably the blower shaft, motor shaft and compressor driving shaft 36 are integral.

Instrumentalities are provided whereby the motor 11 may be automatically controlled in accordance with refrigeration demands and whereby the control is modified when the motor 40 is connected to the independent source of energy so that the automatic control means also controls the operation of the motor 40 in accordance with refrigeration demands. The arrangement is such that an automatic instrument responsive to refrigeration demands controls the flow of electric energy from an electrical source such as battery 18 on said vehicle to the motor 11 and causes the motor 11 to start and stop automatically in response to the refrigeration demands as long as the operator does not himself wish to control the operation of the motor or until he connects the motor 40 with an independent source of electrical energy such as an electric outlet connected to an external source of power, the electric outlet being located at a place where the vehicle is to stand idle for some time.

The arrangement may also include provisions whereby the flow of energy between the battery 18 and the motor 11 is automatically controlled so that when the motor 40 is connected to the independent source of power electric energy ceases to flow from the battery 18 to the motor 11 and thus renders the motor 11 temporarily inoperative as a source of power for the compressor 11. In addition the arrangement is preferably such that the operation of the motor 40 is made responsive to refrigeration demands and the flow of electric energy thereto is therefore automatically controlled to modify the operation of the motor 40 in response to such demands. Thus a thermostat is provided for actuating the compressor in response to the demand of the evaporator and includes a bulb 44 disposed at any suitable point within the refrigerated compartment 34, charged with a volatile liquid and connected by means of a conduit 45 to a metal bellows 46. The metal bellows thus contracts and expands in response to the temperature existing within the compartment 34 and actuates a snap switch 52 by means of the lever 53. The switch is provided with an insulating rod 55 carrying contact blades 56, 57, 58, and 59, all of which are elevated to the position shown in the drawing when the bellows collapses in response to low temperature within the compartment 34 and which are lowered to close their respective circuits whenever the bellows expands in response to a high temperature. The contact blade 56, when closed, may complete the ignition circuit from the low tension coil 21 to ground in parallel with the ignition switch 22 through the switch 56a. The contact blade 57, when closed, may connect the battery main 18' through the switch 57a to the wire 60 which is connected to the governor switch 61, to be described below, which governor switch may connect the wire 60 to the wire 62, thus completing the circuit to the cranking motor 15. The contact blade 58, when closed, may connect the battery main 18' through the switch 58a to the wire 63 which also leads to the governor switch 61, and which may be connected by the governor switch through the wire 64 to the magnetic clutch 37, the other terminal of which is grounded on the motor vehicle frame. The accessory shaft 14 is provided with any suitable governor 65 which operates the switch 61. When the motor is idle, the switch 61 connects wires 60 and 62 in the cranking motor circuit and breaks the connection between the wires 63 and 64 in the magnetic clutch circuit. When the vehicle motor is running, the switch 61 breaks the connection between wires 60 and 62 in the cranking motor circuit and establishes connection between wires 63 and 64 in the magnetic clutch circuit. Thus electric energy is supplied to the motor 11 and its operation is made dependent on refrigeration demands.

The motor 40 may be supplied with current through leads 70 and 71 which are adapted to receive current from any suitable source of external power 72, for example the electric power system of a garage. The lead 71 may be connected to wire 72, forming one terminal of a detachable connector plug 73, by means of switch blade 59 carried on the rod 55 forming part of the switch 52. A solenoid 79 is connected in the wire 71 and is provided with a plunger 80 to which is attached a rod 81 which in turn is connected to the switch blades 56a, 57a, and 58a, previously described. The flow of electric energy from the battery 18 to the motor 11 is stopped when the connector 73 connects motor 40 with the outside source of electricity and the thermostat 44 takes control of the motor 40.

The system operates as follows. Whenever it is desired to operate the vehicle motor the ignition switch 22 is closed and the manually operated switch 16 is closed to operate the starting motor 15 until the vehicle motor becomes self-operative, in the usual manner.

When the temperature within the compartment 34 rises to the point where refrigeration is required, the switch 52 is closed, and whenever the temperature is lowered to the point where refrigeration is not required this switch is opened. Assuming that the plug 73 is disconnected and that the vehicle motor is not operating and is not being manually controlled by the operator when the switch 52 is closed, the governor switch is in the position indicated in full lines, completing contact between the wires 60 and 62. Because the plug 73 is disconnected, the solenoid 79 is deenergized and all of the switch contacts 56a, 57a, and 58a are closed. The contact 56 now completes the ignition circuit. The governor switch 61 is in the full line position and connects wires 60 and 62. The contact 57 completes the circuit to the cranking motor which thereupon cranks the vehicle motor until the latter becomes self-operative. When this occurs the governor switch moves from the full line to the dotted line position, breaking contact between wires 60 and 62, thus interrupting the cranking motor circuit and establishing contact between wires 63 and 64, thus completing the circuit to the magnetic clutch 37 since the contact 58 has already been closed. The compressor is now operated from the vehicle motor until the refrigeration demand has been satisfied, at which time the switch 52 will be opened, breaking the ignition circuit and stopping the vehicle motor, unless in the meantime the switch 22 has been closed by hand to prevent stopping of the motor when refrigeration demand ceases.

If the vehicle motor should be running when the automatic switch 52 closes, the governor switch 61 will be in the dotted line position as above described, and the contact 58 will thereupon immediately energize the magnetic clutch to operate the compressor. The cranking motor 15 cannot be actuated because its circuit has been interrupted by the governor switch.

When it is desired to operate the compressor from an independent source of power, for example when the vehicle is parked over night in a garage, the plugs 73 are connected to a source of power. Thereafter whenever the automatic switch 52 closes in response to a refrigerating demand, the contact 59 will close to energize the circuit of the motor 40. As soon the contact 59 closes, the solenoid 79 opens the switches 56a, 57a, and 58a, and stops the flow of electric energy from battery 18 to motor 11, so that none of the vehicle motor control circuits can be operated. The switch 52 is so designed that the contact 59 will close before any of the contacts 56, 57, or 58. The compressor is disconnected from the vehicle motor because the magnetic clutch 37 is deenergized. The motor 40 will then continue to operate the compressor until the refrigerating demand has been satisfied, at which time the automatic switch 52 will interrupt its power circuit at 59.

It will thus be appreciated that the above described system provides means for insuring operation of the compressor from the vehicle motor at all times, whether the vehicle be in operation or idle, and that the operation of the refrigerating system is entirely automatic in response to refrigeration demand.

While the form of embodiment of the invention as herein disclosed, constitutes a preferred form, it is to be understood that other forms might be adopted, all coming within the scope of the claims which follow.

What is claimed is as follows:

1. Refrigerating apparatus comprising in combination a motor vehicle, a motor for driving the vehicle, a refrigerating system carried by the vehicle and including a compressor, means for mechanically connecting the compressor to the vehicle motor, and means for operating the compressor from a source of energy independent of the vehicle.

2. Refrigerating apparatus comprising in combination a motor vehicle, a motor for driving the vehicle, a refrigerating system carried by the vehicle and including a compressor, means for mechanically connecting the compressor to the vehicle motor, and an electric motor for operating the compressor and adapted to be energized from a source of current independent of the vehicle.

3. Refrigerating apparatus comprising in combination, a motor vehicle, a refrigerating system carried by the motor vehicle and including a compressor, means for connecting the compressor to the vehicle motor to be operated thereby, means for actuating the compressor from an independent source of energy, and means responsive to the supply of energy from said independent source for preventing operation of the connecting means.

4. Refrigerating apparatus including in combination a motor vehicle, a refrigerating system carried by the vehicle and including a compressor adapted to be operated by the vehicle motor, a control circuit for the vehicle motor, means for automatically closing the control circuit in response to refrigerating demand, means for actuating the compressor from an external source of energy, and means responsive to the supply of energy from the external source for preventing closing of the control circuit.

5. Refrigerating apparatus including in combination a motor vehicle, a refrigerating system carried by the vehicle and including a compressor adapted to be operated by the vehicle motor, an ignition circuit for the vehicle motor, means for automatically closing the ignition circuit in response to refrigerating demand, means for actuating the compressor from an independent source of energy, and means responsive to the supply of energy from the independent source for preventing closing of the ignition circuit.

6. Refrigerating apparatus comprising in combination, a motor vehicle, a refrigerating system including a compressor adapted to be driven by the vehicle motor, means operated automatically in response to refrigerating demand for starting the vehicle motor, means for actuating the compressor from an independent source of energy, and means responsive to the supply of energy from the independent source for preventing operation of the starting means.

7. Refrigerating apparatus comprising in combination a motor vehicle, a refrigerating system including a compressor, means for connecting the compressor to the vehicle motor in response to refrigerating demand, means for actuating the compressor from an independent source of energy and means for preventing operation of the connecting means in response to the supply of energy from said independent source.

8. Refrigerating apparatus comprising in combination a motor vehicle, a refrigerating system carried by the vehicle including a compressor, means for actuating the compressor from the vehicle motor, means adapted to be operated from an independent source of energy for actuating the compressor, a control device for the first-mentioned actuating means, a device for controlling energy from the independent source, common means operated automatically in response to refrigerating demand for actuating both of said control devices and means for selectively rendering one of the compressor actuating means inoperative.

9. Refrigerating apparatus comprising in combination, a motor vehicle, a refrigerating system including a compressor adapted to be driven by the vehicle motor, a battery, an electrical connection between said battery and motor, means operated automatically in response to refrigerating demand for starting the vehicle motor by controlling said electrical connection, means for actuating the compressor from an independent source of energy, and means responsive to the supply of energy from an independent source for preventing operation of the starting means by modifying said electrical connection.

10. Refrigerating apparatus comprising in combination, a motor vehicle having a vehicle motor the operation of which is dependent on the flow of electric energy from an electrical source on said vehicle, a refrigerating system including a compressor adapted to be driven by the vehicle motor, an electrical connection between said electrical source and said vehicle motor, means operated automatically in response to refrigerating demands for starting the vehicle motor by controlling said electrical connection, means including a second motor for actuating the compressor from an independent source of electrical energy outside said vehicle, a detachable connector for connecting said second motor to said independent source and means responsive to the supply of energy from the independent source when said connector is connected for preventing operation of the starting means by stopping the flow of electric energy from said electrical source on said vehicle to said first named motor.

11. Refrigerating apparatus comprising in combination, a motor vehicle having a vehicle motor the operation of which is dependent on the flow of electric energy from an electrical source on said vehicle, a refrigerating system including a compressor adapted to be driven by the vehicle motor, a compartment on said vehicle refrigerated by said refrigerating system, an electrical connection between said electrical source and motor, means including a thermostat responsive to conditions in said compartment and operated automatically in response to refrigerating demand for starting the motor by controlling said electrical connection, means including a second motor for actuating the compressor from an independent source of electrical energy outside said vehicle, a detachable connector for connecting said second motor to said independent source and means responsive to the supply of energy from the independent source when said connector is connected for preventing operation of the starting means by stopping the flow of electric energy from said electrical source on said vehicle to said first named motor.

12. Refrigerating apparatus comprising in combination, a motor vehicle having a vehicle motor the operation of which is dependent on the flow of electric energy from an electrical source on said vehicle, a refrigerating system including a compressor adapted to be driven by the vehicle motor, a compartment on said vehicle refrigerated by said refrigerating system, an electrical connection between said electrical source and motor, means including a thermostat responsive to conditions in said compartment and operated automatically in response to refrigerating demands for starting the motor by controlling said electrical connection, means including a second motor for actuating the compressor from an independent source of electrical energy outside said vehicle, a detachable connector for connecting said second motor to said independent source and means responsive to the supply of energy from the independent source when said connector is connected for preventing operation of the starting means by causing said thermostat to control the operation of said second motor.

13. Refrigerating apparatus comprising in combination, a motor vehicle having a vehicle motor the operation of which is dependent on the flow of electric energy from an electrical source on said vehicle, a refrigerating system including a compressor adapted to be driven by the vehicle motor, an electrical connection between said electrical source and motor, means operated automatically in response to refrigerating demands for starting the motor by controlling said electrical connection, means including a second motor for actuating the compressor from an independent source of electrical energy outside said vehicle, a detachable connector for connecting said second motor to said independent source and means including a relay responsive to the supply of energy from the independent source when said connector is connected for preventing operation of the starting means by stopping the flow of electric energy from said electrical source on said vehicle to said first named motor.

14. Refrigerating apparatus including in combination, a motor vehicle, a refrigerating system carried by the vehicle and including a compressor adapted to be operated by the vehicle motor, a control circuit for the vehicle motor, means for automatically closing the control circuit in response to refrigerating demand, means including a second motor for actuating the compressor from an external source of electrical energy, a connector plug for connecting said second motor to said source of electrical energy, and means responsive to the supply of energy from the external source when said second motor is connected to said external source for preventing closing of the control circuit.

15. Refrigerating apparatus comprising in combination, a motor vehicle, a refrigerating system carried by the vehicle including a compressor, means for actuating the compressor from the vehicle motor, means including a second motor adapted to be operated from an independent source of electrical energy for actuating the compressor, a control device for the first mentioned actuating means comprising a control for the first named motor, a device for controlling energy from the independent electrical source to the second motor, common means operated automatically in response to refrigerating demand for actuating both of said control devices and means for selectively rendering one of the compressor actuating means inoperative by the connection of said second motor to said independent source of electrical energy.

16. Refrigerating apparatus comprising in combination, a motor vehicle having a battery and a vehicle motor the operation of which is dependent on the flow of electric energy from said battery to said vehicle motor, a refrigerating system carried by the vehicle including a compressor, means for actuating the compressor from the vehicle motor, means including a second motor adapted to be operated from an independent source of electrical energy for actuating the compressor, a control device for the first mentioned actuating means comprising a circuit controller for controlling the flow of electric energy from said battery to said vehicle motor, a detachable connector for connecting said second motor to said independent source, a device for controlling electrical energy from the independent source when said connector is connected to said independent source, common means operated automatically in response to refrigerating demand for actuating both of said control devices and means for selectively rendering one of the compressor actuating means inoperative while said connector is connected to said independent source.

JOHN RALPH FEHR.